3,472,908
THERMAL ISOMERIZATION OF 1,4-DIENES
Robert Junior Harder, Wilmington, Del., assignor to E. I. du Pont de Nemours and Company, Wilmington, Del., a corporation of Delaware
No Drawing. Filed Aug. 1, 1967, Ser. No. 657,484
Int. Cl. C07c 5/30, 17/24
U.S. Cl. 260—680  6 Claims

ABSTRACT OF THE DISCLOSURE

A process for geometrically isomerizing a 1,4-diene which is not at its isomeric equilibrium composition and bringing it closer to its equilibrium composition which comprises mixing the 1,4-diene with an isomerizing agent and heating the mixture to temperatures sufficiently high to cause isomerization.

BACKGROUND OF THE INVENTION

Alpha-olefin elastomers are of increasing importance today. Particularly valuable are the copolymers containing sulfur-curable side-chain unsaturation resulting from incorporation of non-conjugated diene units. U.S. Patent 2,933,480 to Gresham et al., describes representative copolymers of this type. Non-conjugated dienes useful in making these copolymers include 1,4-hexadiene itself and derivatives wherein the monomer still has one terminal vinyl group, e.g., 4-methyl-1,4-hexadiene. Other 1,4-diene-containing elastomers are also important, for example, the copolymer prepared by copolymerizing isobutylene with 2-alkyl-1,4-hexadienes in the presence of a cationic catalyst, e.g., a Friedel-Crafts catalyst such as boron trifluoride or stannic chloride-water.

Various catalysts are known for use in synthesizing 1,4-dienes from α-monoolefins and conjugated dienes. Japanese patent publication 41/8052 discloses making predominantly cis-1,4-dienes with a $CoX_2(R_2PCH_2CH_2PR_2)_2$-aluminum trialkyl catalyst where X is halogen and R is alkyl or phenyl. Predominantly trans-1,4-hexadiene can be prepared by reacting ethylene and 1,3-butadiene in the presence of the rhodium chloride catalyst disclosed in U.S. Patent 3,013,066 to Alderson.

In the preparation of some copolymers in which a 1,4-diene is one of the monomers used, it is sometimes advantageous to use either the cis or trans geometric isomer, however, the other isomer may be more readily available. For example, it is often desirable to use trans-1,4-hexadiene in the preparation of certain hydrocarbon copolymers, yet under certain conditions the cis isomer is more economically obtainable. In view of these circumstances, a process for isomerizing one geometric 1,4-diene isomer to the other would be highly desirable.

It is known in the art to isomerize 1,4-dienes to the more stable conjugated 1,3-diene using $SO_2$; e.g., see Grummit and Chudd, J. Am. Oil Chemists Soc. 32, 454–59 (1955); however, prior to the present invention a method for isomerizing cis or trans 1,4-dienes to the other geometric isomer has not been reported.

SUMMARY

According to this invention a process is provided for geometrically isomerizing a 1,4-diene which is not at its geometric isomer equilibrium composition and bringing it closer to its equilibrium composition which comprises heating the 1,4-diene in the presence of at least one isomerizing agent from the group consisting of nitric oxide, selenium, sulfur and selected sulfur compounds at temperatures of about 75–450° C.

DETAILED DESCRIPTION

The term "1,4-diene" as used herein represents a diolefin which contains the structure, —C=C—C—C=C, as in, for example, 1,4-hexadiene and 2,5-heptadiene. The term "geometric isomerization" is used in its conventional sense to represent the interconversion of the configurations of the atoms of a diene about either or both of the diene double bonds. For example, in the case of 1,4-hexadiene, two geometric isomers exist, the cis structure,

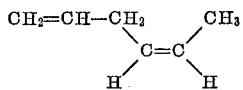

and the trans structure,

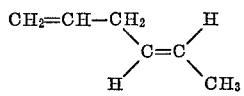

which are interconvertible under the conditions of the process of this invention.

It should be understood that each 1,4-diene under consideration has a geometric isomer equilibrium composition which means there is a particular geometric isomer mixture of that diene in which the components are present in a state of greatest isomer stability and lowest free energy as will be readily understood by one skilled in the art. The process of this invention is applied to a 1,4-diene isomer or isomeric mixture which is not at its equilibrium composition to bring it closer to or even all the way to this composition. For example, as applied to 1,4-hexadiene which has an equilibrium composition of approximately 70% trans-isomer and 30% cis-isomer, the process of this invention operates on either of the pure isomers or any isomeric mixture not at the equilibrium composition and effects isomerization until the equilibrium composition is reached. The pure isomers can be separated if desired at this time. The process may of course be stopped prior to the time that the equilibrium composition is reached, if desired.

The process of this invention can be used to isomerize any geometrically isomerizable 1,4-diene which is not at its equilibrium composition. The term "geometrically isomerizable" is meant to include any 1,4-diene which can have more than one configuration or spatial arrangement around either or both double bonds of the 1,4-diene.

Representative geometrically isomerizable, 1,4-dienes which can be isomerized according to this invention are those corresponding to the formula:

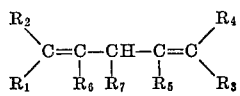

wherein each R group ($R_1$–$R_7$) is independently hydrogen; $C_1$–$C_{18}$ alkyl; $C_3$–$C_8$ cycloalkyl; $C_1$–$C_{18}$ substituted alkyl wherein the substituents are halo and/or alkoxy; $C_6$–$C_{15}$ aryl; $C_7$–$C_{18}$ alkaryl; $C_7$–$C_{18}$ aralkyl; $C_1$–$C_{12}$ alkoxy; halo or one of the pairs $R_1$–$R_2$ or $R_3$–$R_4$ is joined together to form an aliphatic ring containing about 3–8 carbon atoms; with the proviso that $R_1$ is not the same as $R_2$ when $R_3$=$R_4$ and $R_3$ is not the same as $R_4$ when $R_1$=$R_2$.

Representative 1,4-dienes are 1,4-hexadiene;
3,3,6-tribromo-1,4-hexadiene;
6-bromo-1,4-hexadiene; 1,4-heptadiene;
4-ethyl-1,4-hexadiene;
1,4-octadiene;
1,4-nonadiene;
1,4-decadiene;
3-ethyl-1,4-octadiene;
2,6-dimethyl-2,5-octadiene;
1,4-undecadiene;

4-methyl-1,4-decadiene;
1,4-tetradecadiene;
1-phenyl-1,4-hexadiene;
4,6-dibromo-1,4-hexadiene;
3,6-dichloro-2,5-dimethyl-1,4-hexadiene;
2,3,5-trimethy-1,4-heptadiene;
6-methyl-4-propyl-1,4-nonadiene;
2,5-heptadiene; and 3,6-dodecadiene.

Isomerizing agents useful in this invention include elemental sulfur, elemental selenium, nitric oxide and selected sulfur compounds such as sulfur dioxide and compounds which generate sulfur dioxide under the reaction conditions described herein; polysulfides of the formula $R_8$—$S_n$—$R_9$ wherein $n$ is 2 to 8 and each R group ($R_8$, $R_9$) is independently $C_1$-$C_{12}$ alkyl, $C_1$-$C_{12}$ haloalkyl, $C_3$-$C_8$ cycloalkyl, $C_6$-$C_{15}$ aryl, $C_7$-$C_{18}$ alkaryl, $C_7$-$C_{18}$ aralkyl, acyl or thiocarbamoyl; thiols of the formula T—$(SH)_n$ wherein $n'$ is 1 or 2, T is hydrogen, $R_8$ as defined above, $C_1$-$C_{12}$ alkylene, $C_6$-$C_{15}$ arylene, benzothiazolyl, imidazolinyl, thiazolinyl, dihydropyrimidinyl or pyrimidinyl; sulfonyl halides of the formula $R_{10}$—$SO_2X$ wherein $R_{10}$ is equal to $R_8$ as defined above and X is chloro, bromo or iodo; and sulfinyl chlorides of the formula,

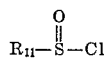

wherein $R_{11}$ is $C_1$-$C_{12}$ alkyl, $C_6$-$C_{15}$ aryl, chloro, bromo or iodo. Sulfur dioxide and p-toluene sulfonyl chloride are preferred because of the fast rate of isomerization which they induce with minimum formation of by-products, such as conjugated dienes. The amount of isomerizing agent used will vary with the activity of the isomerizing agent and the temperature at which the reaction is carried out, lesser amounts being required as the isomerizing agent activity and temperature increase. However, at least about 0.001 part by weight of isomerizing agent per 1.0 part of 1,4-diene is required to cause isomerization at a practical rate. The preferred amounts to be used in each case can be routinely determined by one skilled in the art by reference to the general principles taught herein and the examples which follow.

Representative isomerizing agents in addition to those disclosed above are diphenyl disulfide, benzyl methyl disulfide, dibenzoyl dissulfide, dithiocarbamoyl disulfide, 2-mercaptobenzothiazole, 2-mercaptoimidazoline, hydrogen sulfide, benzene sulfonyl chloride, p-toluene sulfonyl chloride, 2,4-dimethylbenzene sulfonyl chloride, methane sulfonyl chloride, ethane sulfonyl chloride, dichlorobenzene sulfonyl chloride, benzene sulfinyl chloride, thionyl chloride and 2,5-dihydrothiophene-1,1-dioxide.

The process of this invention is carried out in a suitable vessel such as a shaker tube when performed under pressure or a conventional round-bottom flask at atmospheric pressure. The 1,4-diene and isomerizing agent are introduced into the vessel and heated, preferably with agitation, for a time sufficient to effect the degree of isomerization desired. The reaction mixture is then cooled to room temperature and the isomerizing agent removed from the 1,4-diene by appropriate means such as fractional distillation or selective extraction.

The temperature to which the reaction mixture is heated to effect isomerization at a practical rate will depend on the activity of the particular isomerizing agent used but will generally vary from about 75–450° C. At temperatures below 75° C., isomerization occurs too slowly with any of the agents to be practical and at temperatures above 450° C., undesirable side reactions become significant except at very short contact times, e.g., a few seconds or less. Recommended preferred temperature ranges for specific isomerizing agents are: sulfur dioxide, 160–225° C., sulfonyl chloride, 80–225° C., and the sulfides represented above by the formula $R_8$—$S_n$—$R_9$, 175–350° C.

The length of time during which the 1,4-diene is heated in contact with the isomerizing agent will vary with the activity of the isomerizing agent, the temperature, and the degree of isomerization desired, but will generally vary from less than a second to about 20 hours. It is preferred that the heat treatment be continued no longer than is necessary in order to minimize undesirable side reactions.

The pressure under which the reaction is carried out is not critical and can vary from about 1 atmosphere to 3000 p.s.i.g. Usually the pressure is the autogenous pressure of the particular reaction system and will largely be determined by the temperature, quantity and type of isomerizing agent used.

In carrying out the process of this invention, a solvent for the 1,4-diene and isomerizing agent can be used although it is not essential. When used, a solvent must be chosen which is inert to the particular 1,4-diene and isomerizing agent with which it is used. Generally suitable solvents include hydrocarbons such as benzene, Decalin, diphenyl methane and hexane, chlorinated hydrocarbons such as chlorobenzene; acetonitrile; and diphenyl ether.

Since the system must be maintained free of oxygen, the process is carried out in an atmosphere of nitrogen or some other inert gas. The process can be carried out batchwise or continuously as illustrated in the examples which follow.

After the isomerization has proceeded to the point desired, the cis and trans isomers can be substantially separated by conventional techniques such as gas chromatography or conversion of the 1,4-dienes to chemical derivatives followed by separation of the derivatives. A typical separation involves bromination of the cis and trans 1,4-diene mixture to obtain solid brominated derivatives. The brominated compounds are then separated by fractional crystallization from a suitable solvent such as methanol and the substantially pure isomers regenerated by treatment with zinc dust in ethanol. The diene isomer mixtures which already contain bromine must, of course, be separated by gas chromatography or some other method.

The process of this invention provides a rapid feasible means for geometrically isomerizing 1,4-dienes. It is particularly advantageous in that it does not produce significant amounts of the more stable conjugated positional isomers which are unsuitable for use in the preparation of polymeric products in which 1,4-dienes are used and which therefore must be removed, frequently with great difficulty, from the 1,4-diene prior to its use.

The invention will be more particularly illustrated by reference to the following examples wherein parts are by weight unless otherwise specified.

Example 1

This example illustrates the isomerization of cis- and trans-1,4-hexadiene to the other geometric isomer under super-atmospheric pressure. Eight runs are carried out as follows: An 80 milliliter stainless steel shaker tube is charged with 1,4-hexadiene (cis in runs 1–7, trans in run 8) under nitrogen. The tube is closed, cooled with a crushed solid carbon dioxide-acetone bath and evacuated. If the isomerization agent used is a solid or liquid, it is added to the tube at the same time as the 1,4-hexadiene; if a gas, it is distilled into the tube after the tube is cooled and evacuated. The mixture is then heated for the desired length of time, cooled to room temperature and vented. Table I indicates the isomerizing agent used and the conditions of the reaction for each run.

The analytical procedures vary with the isomerizing agent used as follows:

In the case of sulfur, thiobenzoic acid, diphenyl, disulfide and hydrogen sulfide, the reaction product is analyzed for cis- and trans-1,4-hexadiene directly by gas chromatography. In the case of thionyl chloride the reaction product is analyzed directly by gas chromatography and then washed with 5% aqueous sodium bicarbonate until the aqueous solution remains basic and dried with anhydrous sodium sulfate. In the case of sulfur dioxide the reaction product is distilled and the distillate is washed with 5% aqueous sodium bicarbonate solution until the aqueous solution remains basic, dried over anhydrous sodium sulfate, and analyzed by gas chromatography.

of isomerizing agent per 1.0 part of 1,4-diene, said isomerizing agent being from the group consisting of:

sulfur;
selenium;
nitric oxide;
sulfur dioxide;
compounds which generate sulfur dioxide under the

TABLE I

| Run No. | 1,4-hexadiene, grams | Isomerizing agent | Isomerizing agent, wt. (grams) | Temp., °C. | Pressure | Time (hrs.) | Trans-/cis-1,4-hexadiene ratio |
|---|---|---|---|---|---|---|---|
| 1 | 25 (cis) | $(C_6H_5)S-S(C_6H_5)$ | 3.0 | 250 | Autogenous | 4.0 | 55/45 |
| 2 | 35 (cis) | Sulfur | 2.0 | 200 | Autogenous (160 p.s.i.g.) | 4.0 | 36/64 |
| 3 | 35 (cis) | $(C_6H_5)\overset{\overset{O}{\|}}{C}-SH$ | 2.0 | 250 | Autogenous | 4.0 | 32/68 |
| 4 | 35 (cis) | $SOCl_2$ | 3.0 | 250 | do | 4.0 | 70/30 |
| 5 | 35 (cis) | $H_2S_2$ | 3.0 | 250 | do | 4.0 | 49/51 |
| 6 | 35 (cis) | $SO_2$ | 3.0 | 225 | Autogenous (650 p.s.i.g.) | 0.5 | 70/30 |
| 7 | 35 (cis) | $SO_2$ | 4.0 | 210 | Autogenous (460 p.s.i.g.) | 0.5 | 51/49 |
| 8 | 17.5 (trans) | $SO_2$ | 16 | 200 | Autogenous | 4.0 | 70/30 |

Example 2

This example illustrates cis-trans isomerization of 1,4-hexadiene at atmospheric pressure. The process is carried out as follows: a 100-milliliter round-bottom 2-neck flask, fitted with a thermometer, a condenser and a magnetic stirrer, is charged under nitrogen with 5 grams of cis-1,4-hexadiene and 45 grams of benzene sulfonyl chloride. The resulting mixture is heated under nitrogen to reflux, while being stirred at 114°C. for one hour. The isomerizing agent and 1,4-diene are separated by distillation. An analysis of the final product reveals that the 1,4-hexadiene has a trans/cis isomer ratio of 67/33 with no appreciable quantity of 2,4-hexadiene present.

Example 3

This example illustrates a continuous process for isomerizing 1,4-hexadiene. A 100-milliliter round-bottom flask, having a side arm equipped with a thermometer, is fitted with a magnetic stirrer and a distillation head which permits a controlled reflux ratio. The flask is charged with 15 g. (0.079 gram-mole) of recrystallized p-toluene-sulfonyl chloride and 30 g. (0.18 gram-mole) of diphenylmethane. When 3.5 g. (0.043 gram-mole) of freshly distilled cis - 1,4 - hexadiene has been subsequently added, the solution is brought to reflux under nitrogen. After this mixture has been agitated for 40 minutes at 136° C. (pot temperature), pure cis-1,4-hexadiene is added continuously (through a needle inserted through a rubber diaphragm fitted in place of the head thermometer) at the same rate that the refluxing mixture of cis and trans-1,4-hexadiene is being taken off. During approximately 20 hours of operation at 135-145° C. (pot temperature) the cis-1,4-hexadiene is added at a maximum through-put rate of about 150 g. per 24 hours. The mixture of trans and cis-1,4-hexadiene which is obtained contains 50-57% of trans isomer as determined by gas chromatographic analysis. 2,4-hexadiene is not present in more than trace amounts in the recovered hexadiene.

What is claimed is:

1. A process for geometrically isomerizing a 1,4-diene having a geometric isomer ratio not at its equilibrium composition to an isomeric mixture of said 1,4-diene having an isomer ratio closer to its equilibrium composition, which comprises mixing said 1,4-diene with an isomerizing agent in proportions by weight of at least 0.001 part conditions of this process;
polysulfides of the formula $R_8(S)_n-R_9$ wherein $n$ is 2 to 8 and $R_8$ and $R_9$ are each independently $C_1-C_{12}$ alkyl, $C_1-C_{12}$ haloalkyl, $C_3-C_{18}$ cycloalkyl, $C_6-C_{15}$ aryl, $C_7-C_{18}$ alkaryl, $C_7-C_{18}$ aralkyl, acyl or thiocarbamoyl;
thiols of the formula $T-(SH)_{n'}$ wherein $n'$ is 1 or 2; T is hydrogen, $R_8$ as defined above, $C_1-C_{12}$ alkylene, $C_6-C_{15}$ arylene, benzothiazolyl, imidazolinyl, thiazolinyl, dihydropyrimidinyl or pyrimidinyl;
sulfonyl halides of the formula $R_{10}-SO_2X$ where $R_{10}$ is equal to $R_8$ as defined above and X is chloro, bromo or iodo; and
sulfinyl chlorides of the formula $$R_{11}-\overset{\overset{Cl}{\|}}{S}=O$$

wherein $R_{11}$ is $C_1-C_{12}$ alkyl, $C_6-C_{15}$ aryl, chloro, bromo or iodo;
and heating said mixture to temperatures at which isomerization occurs.

2. The process of claim 1 wherein the 1,4-diene corresponds to the formula:

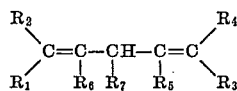

in which each R group, $R_1-R_7$, is independently hydrogen, $C_1-C_{18}$ alkyl, $C_1-C_{18}$ substituted alkyl in which the substituents are halo or $C_1-C_{12}$ alkoxy, $C_3-C_8$ cycloalkyl, $C_6-C_{15}$ aryl, $C_7-C_{18}$ alkaryl, $C_7-C_{18}$ aralkyl, $C_1-C_{12}$ alkoxy, halo or one of the pairs $R_1-R_2$ or $R_3-R_4$ is joined together to form an aliphatic ring containing about 3-8 carbon atoms, with the provisos that $R_1$ is not the same as $R_2$ when $R_3=R_4$ and $R_3$ is not the same as $R_4$ when $R_1=R_2$.

3. The process of claim 2 wherein the isomerizing agent is sulfur dioxide, thionyl chloride, a sulfonyl chloride of the formula $R'-SO_2Cl$ wherein $R'$ is from the group consisting of phenyl and p-tolyl, or diphenyl disulfide.

4. The process of claim 3 wherein the 1,4-diene is 1,4-hexadiene.

5. The process of claim 4 wherein the isomerizing agent is sulfur dioxide and the 1,4-hexadiene-sulfur dioxide mixture is heated to a temperature between about 160–225° C.

6. The process of claim 4 wherein the isomerizing agent is p-toluene sulfonyl chloride and the 1,4-hexadiene-p-toluenesulfonyl chloride mixture is heated to a temperature of about 90–225° C.

References Cited

UNITED STATES PATENTS 2,347,667  5/1944  Craig ------------- 260—680

OTHER REFERENCES

Grummit et al., J. Am. Oil Chemists' Soc., 32, 454–459 (1955).

Asscher et al., J. Chem. Soc., 1964, pp. 4,962–4,971.

Golub, J. Polymer Science, Pt. B, Polymer Letters 4, 227–230 (1966).

PAUL M. COUGHLAN, JR., Primary Examiner

U.S. Cl. X.R.

260—654, 683.2